(12) United States Patent
Yanagita et al.

(10) Patent No.: US 9,282,300 B2
(45) Date of Patent: Mar. 8, 2016

(54) PROJECTOR AND CONTROL METHOD

(75) Inventors: Yoshiho Yanagita, Tokyo (JP); Osamu Ishibashi, Tokyo (JP); Kazuhiko Aoki, Tokyo (JP); Masahiko Ohta, Tokyo (JP); So Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 245 days.

(21) Appl. No.: 13/978,526

(22) PCT Filed: Oct. 20, 2011

(86) PCT No.: PCT/JP2011/074166
§ 371 (c)(1),
(2), (4) Date: Jul. 5, 2013

(87) PCT Pub. No.: WO2012/114578
PCT Pub. Date: Aug. 30, 2012

(65) Prior Publication Data
US 2013/0278906 A1    Oct. 24, 2013

(30) Foreign Application Priority Data

Feb. 24, 2011  (JP) .................................. 2011/038319

(51) Int. Cl.
*G03B 21/60* (2014.01)
*H04N 9/31* (2006.01)
(Continued)

(52) U.S. Cl.
CPC ............ *H04N 9/3129* (2013.01); *G02B 26/101* (2013.01); *G03B 21/206* (2013.01);
(Continued)

(58) Field of Classification Search
CPC ...... G03B 21/204; G03B 21/56; G03B 21/60; G03B 21/567; H04N 9/3129; H04N 9/3135; H04N 9/3194; G09G 2320/0693

USPC ........................................................ 359/443
See application file for complete search history.

(56) References Cited

U.S. PATENT DOCUMENTS 4,979,030 A    12/1990  Murata
7,884,816 B2    2/2011  Burroughs et al.
(Continued)

FOREIGN PATENT DOCUMENTS

JP    54-089525 A    7/1979
JP    02-149887 A    6/1990
(Continued)

OTHER PUBLICATIONS

International Search Report dated Jan. 24, 2012 in PCT/JP2011/074166, with English translation thereof.
(Continued)

*Primary Examiner* — William C Dowling
*Assistant Examiner* — Ryan Howard
(74) *Attorney, Agent, or Firm* — McGinn IP Law Group, PLLC

(57) ABSTRACT

A projector includes a screen having a periodic array of color stripes for producing visible light depending on incident light, a light source that remits a light beam, a projection unit that scans an area of the screen where the color stripes are disposed, with the light beam in a direction across the color stripes, to display an image on the screen, a detector that detects the visible light from each of the color stripes as a feedback light pulse, and a controller that adjusts a start-of-emission timing of the light source based on a start-of-detection timing at which the feedback light pulse is detected by the detector and a detection period during which the feedback light pulse is detected by the detector, and controlling the light source to emit the light beam in order to apply light pulses to the color stripes within boundaries thereof.

20 Claims, 15 Drawing Sheets

(51) Int. Cl.
    *G02B 26/10* (2006.01)
    *G09G 3/00* (2006.01)
    *G03B 33/00* (2006.01)
    *G03B 21/20* (2006.01)

(52) U.S. Cl.
    CPC ............... *G03B 21/60* (2013.01); *G03B 33/00* (2013.01); *G09G 3/001* (2013.01); *G09G 2300/026* (2013.01); *G09G 2310/08* (2013.01); *G09G 2320/0693* (2013.01); *G09G 2360/145* (2013.01); *H04N 9/3135* (2013.01); *H04N 9/3194* (2013.01)

(56) References Cited

U.S. PATENT DOCUMENTS

| | | | |
|---|---|---|---|
| 2007/0187616 A1 | 8/2007 | Burroughs et al. | |
| 2007/0188417 A1* | 8/2007 | Hajjar et al. | 345/75.1 |

FOREIGN PATENT DOCUMENTS

| | | |
|---|---|---|
| JP | 2007-047355 A | 2/2007 |
| JP | 2008-538145 A | 10/2008 |
| JP | 2009-537868 A | 10/2009 |
| JP | 2009-539120 A | 11/2009 |
| JP | 2011-028065 A | 2/2011 |
| JP | 5589788 B2 | 9/2014 |
| WO | WO 2006/107720 A1 | 10/2006 |
| WO | WO 2007/095329 A2 | 8/2007 |
| WO | WO 2007/134329 A2 | 11/2007 |
| WO | WO 2011/136065 A1 | 11/2011 |
| WO | WO 2012/077417 A1 | 6/2012 |

OTHER PUBLICATIONS

Japanese Office Action dated Jun. 30, 2015 with a partial English translation thereof.

* cited by examiner

PROJECTOR AND CONTROL METHOD

FIELD OF THE INVENTION

The present invention relates to a projector for displaying an image on a screen by scanning the screen with a light beam.

BACKGROUND ART

In recent years, attention has been drawn to scanning-type projectors for displaying an image on a fluorescence screen by scanning the fluorescence screen with a light beam. Such scanning-type projectors often use a galvanometric mirror or a resonant scanning element as a scanning means for scanning the fluorescence screen. Although the resonant scanning element is advantageous in that it can perform high-speed scanning, it is not easy for the resonant scanning element to apply the light beam to an appropriate incident position on the screen because the scanning speed and the scanning amplitude tend to change due to the ambient temperature.

A scanning beam display system that is capable of adjusting the incident position of a light beam on a fluorescence screen is disclosed in Patent document 1.

The fluorescence screen used in the scanning beam display system disclosed in Patent document 1 has a plurality of color stripes arranged in a periodic pattern with servo reference marks, each disposed between adjacent two of the color stripes, for reflecting the light beam.

When the scanning beam display system is in operation, the light beam, which is made up of a plurality of light pulses, is emitted from a light source and applied to the fluorescence screen to scan it in directions perpendicular to the color stripes to excite the fluorescence of each of the color stripes, thereby displaying an image on the fluorescence screen.

The scanning beam display system changes a start-of-emission timing to start emitting the light beam from the light source in each scanning cycle, thereby changing the incident positions of light pulses on the screen in each scanning cycle. When the incident positions of light pulses on the screen change, the amount of light applied to the servo reference marks changes, thereby changing the amplitude of feedback light from servo reference marks. The scanning beam display system detects a change in the amplitude of the feedback light, and adjusts the start-of-emission timing depending on the detected change. In this manner, the incident positions of light pulses on the screen are adjusted to cause the light pulses to be applied to the color stripes.

PRIOR TECHNICAL DOCUMENTS

Patent Documents

Patent document 1: JP 2009-539120 A

SUMMARY OF THE INVENTION

Problems to be Solved by the Invention

In order to adjust incident positions of light pulses on the screen, the scanning beam display system disclosed in Patent document 1 is required to use a special fluorescence screen with servo reference marks each disposed between adjacent two of color stripes.

It is an object of the present invention to provide a projector and a method of controlling such a projector, which are capable of adjusting the incident positions of light pulses without the need for a special screen.

Means for Solving the Problems

According to the present invention, there is provided a projector including a screen having a periodic array of color stripes for producing visible light depending on incident light, a light source for remitting a light beam, a projection unit for scanning an area of the screen where the color stripes are disposed, with the light beam in a direction across the color stripes, to display an image on the screen, a detector for detecting the visible light from each of the color stripes as a feedback light pulse, and a controller for adjusting a start-of-emission timing of the light source based on a start-of-detection timing at which the feedback light pulse is detected by the detector and a detection period during which the feedback light pulse is detected by the detector, and controlling the light source to emit the light beam in order to apply light pulses to the color stripes within boundaries thereof.

According to the present invention, there is also provided a method of controlling a projector including a screen having a periodic array of color stripes for producing visible light depending on incident light, a light source for remitting a light beam, and a projection unit for scanning an area of the screen where the color stripes are disposed, with the light beam in a direction across the color stripes, to display an image on the screen, comprising detecting the visible light from each of the color stripes as a feedback light pulse, and adjusting a start-of-emission timing of the light source based on a start-of-detection timing at which the feedback light pulse is detected by the detector and a detection period during which the feedback light pulse is detected by the detector, and controlling the light source to emit the light beam in order to apply light pulses to the color stripes within boundaries thereof.

Advantages of the Invention

According to the present invention, it is possible to adjust the incident positions of light pulses without the need for a special fluorescence screen.

MODE FOR CARRYING OUT THE INVENTION

Figure 1:
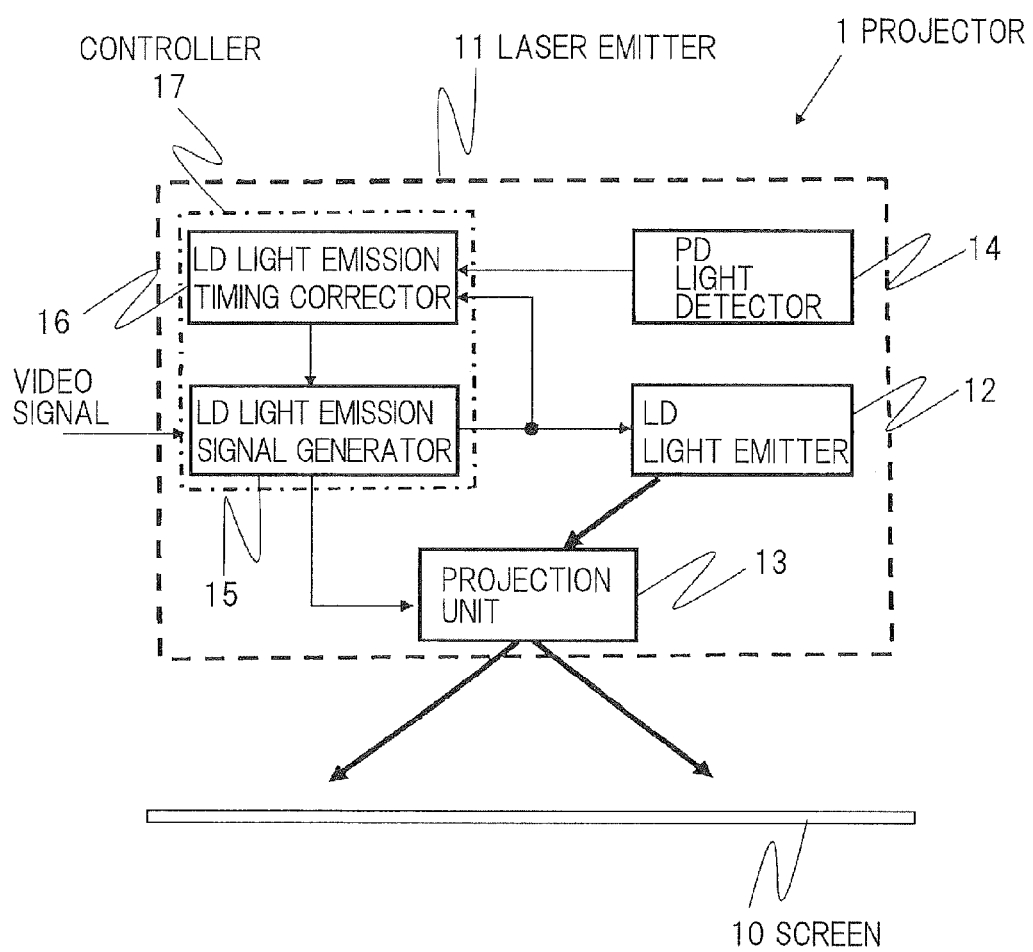
FIG. 1 is a block diagram showing a configuration of a projector according to a first exemplary embodiment of the present invention.

An exemplary embodiment of the present invention will be described below with reference to the drawings. In the description that follows, those parts which have identical functions will be denoted by identical reference characters, and their redundant description may be omitted below.

FIG. 1 is a block diagram showing a configuration of a projector according to a first exemplary embodiment of the present invention. As shown in FIG. 1, projector 1 comprises a scanning rear projector for scanning the rear surface of a screen with a laser beam as a light beam to display an image on the screen. Projector 1 has screen 10 and laser emitter 11.

Screen 10 has a plurality of color stripes arranged in a periodic pattern for emitting visible light depending on incident light applied to screen 10. Specifically, each of the color stripes emits visible light with an intensity depending on the intensity of the incident light.

Figure 2:
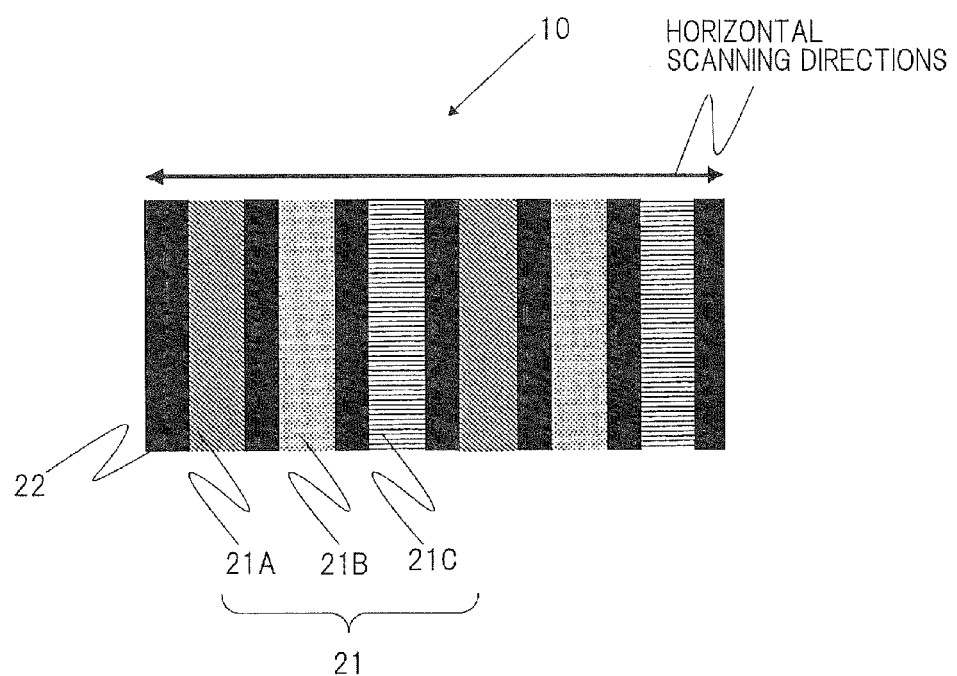
FIG. 2 is a view showing a specific configuration of a portion of a screen.

FIG. 2 is a view showing a specific configuration of a portion of screen 10. As shown in FIG. 2, color stripes 21 are periodically arranged on screen 10, with black stripes 22 each disposed between adjacent two of color stripes 21.

Each of color stripes 21, which comprises an area made of a fluorescent material, generates fluorescence depending on the incident light and emits the generated fluorescence from the front surface of the screen. It is assumed that the fluorescence has wavelengths in the visible range.

As shown in FIG. 2, color stripes 21 include color stripes 21A, 21B, 21C as three types of color stripes for emitting fluorescence at different wavelengths, color stripes 21A, 21B, 21C being arrayed in the order named along a particular direction. For example, color stripes 21A emit red fluorescence, color stripes 21B green fluorescence, and color stripes 21C blue fluorescence. Color stripes 21 are arranged substantially horizontally so that projection unit 13 will scan screen 10 along horizontal scanning directions across the longitudinal directions of color stripes 21.

If the laser beam applied to screen 10 is a visible light beam (wavelength: about 380 nm to 730 nm), then color stripes 21 may be made of a light diffusing material rather than the fluorescent material. Color stripes 21 made of a light diffusing material diffuses the applied light beam to emit a visible light beam for display and emits the diffused light beam to the front surface of screen 10.

Black stripes 22 are areas which absorb a laser beam, for example, so that they block the laser beam against transmission to the front surface of screen 10.

Referring back to FIG. 1, laser emitter 11 scans the area, which has the color stripes 21, of the rear surface of screen 10 with a laser beam along the directions across the longitudinal directions of color stripes 21, thereby displaying an image on screen 10.

Laser emitter 11 includes LD light emitter 12, projection unit 13, PD light detector 14, LD light emission signal generator 15, and LD light emission timing corrector 16.

LD light emitter 12, which is a light source for emitting a laser beam, comprises an LD (semiconductor laser diode) device.

Projection unit 13 scans the area, which has color stripes 21, of the rear surface of screen 10 with the laser beam emitted from LD light emitter 12, thereby displaying an image on screen 10.

Projection unit 13 may scan screen 10 along at least the horizontal scanning directions across the longitudinal directions of color stripes 21. The image may be plotted vertically by a galvanometric mirror or a one-dimensional SLM (Spatial Light Modulator). Projection unit 13 should preferably has a resonant scanner for performing high-speed scanning as a scanning device for horizontally scanning screen 10 with a laser beam.

PD light detector 14 is a detector for detecting fluorescence generated by each of color stripes 21 of screen 10 as a feedback light pulse, and outputting a PD detection signal 53 that represents the intensity of the feedback light to LD light emission timing corrector 16. PD light detector 14 may comprise a PD (PhotoDiode) such as an APD (Avalanche Photodiode) or the like.

LD light emission signal generator 15 and LD light emission timing corrector 16 jointly make up controller 17. Based on the PD detection signal 53 from PD light detector 14, controller 17 determines a start-of-detection timing at which each feedback light pulse from PD light detector 14 starts to be detected and a detection period during which each feedback light pulse from PD light detector 14 is detected. Based on the start-of-detection timing and the detection period, controller 17 adjusts a start-of-emission timing to start emitting a laser beam from LD light emitter 12 and controls LD light emitter 12 to emit a plurality of light pulses as a laser beam so that the light pulses will be applied to respective color stripes 21 within their boundaries.

LD light emission signal generator 15 is a driver which adjusts the start-of-emission timing, a light emission period, and the light emission intensity of LD light emitter 12, and which energizes projection unit 13 to scan screen 10 with the laser beam.

More specifically, LD light emission signal generator 15 holds control information representing light emission intervals and light emission periods of LD light emitter 12. LD light emission signal generator 15 inputs an LD light emission signal depending on the control information to LD light emitter 12 to cause LD light emitter 12 to emit a plurality of light pulses as a laser beam. LD light emission signal generator 15 also generates a scanning reference signal for projection unit 13 in response to the synchronizing signal of an input video signal, and inputs a scanning drive signal depending on the scanning reference signal to projection unit 13, thereby energizing projection unit 13 with the scanning drive signal.

LD light emission timing corrector 16 controls LD light emission signal generator 15 to drive LD light emitter 12 and projection unit 13 to carry out a calibration process for calibrating the start-of-emission timing and the light emission period of LD light emitter 12 and the scanning amplitude and the scanning frequency of projection unit 13 at the time an image is displayed based on the input video signal. In the present exemplary embodiment, the control information held by LD light emission signal generator 15 is generated by the calibration process. However, values calculated from the specifications of screen 10 and projection unit 13 may be preset as the control information in LD light emission signal generator 15.

When an image is displayed based on the input video signal, LD light emission timing corrector 16 functions as a corrector for correcting light emission intervals represented by the control information held by LD light emission signal generator 15 based on the start-of-detection timing and the detection period of each feedback light pulse detected by PD light detector 14. The start-of-detection timing of LD light emitter 12 is thus adjusted to adjust the incident position on screen 10 of each of the light pulses emitted from LD light emitter 12.

Operation of projector 1 will be described below.

Figure 3:
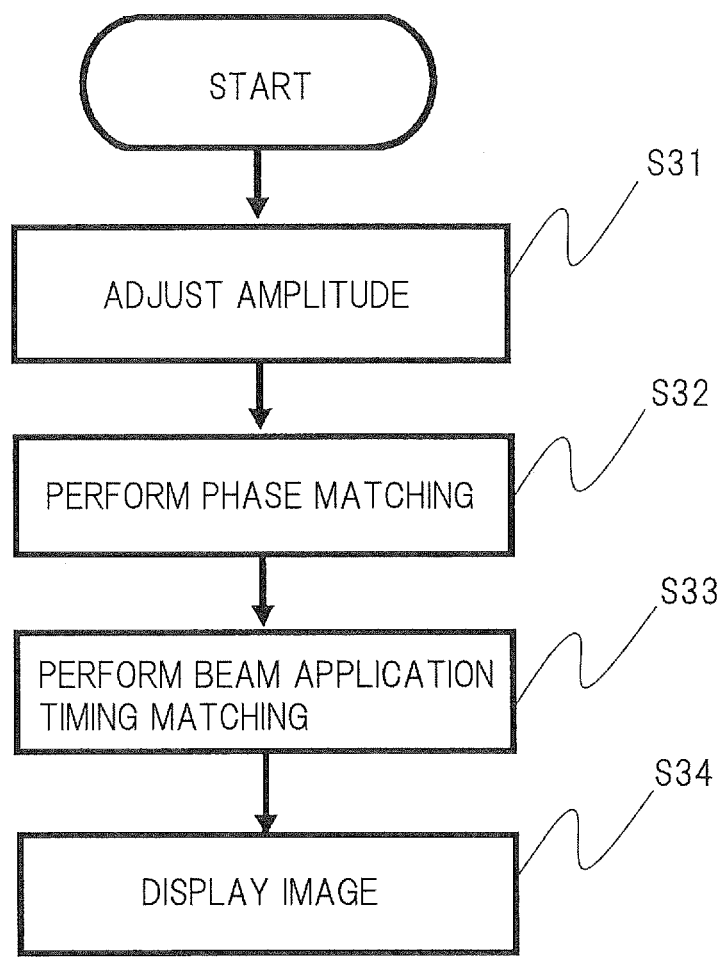
FIG. 3 is a flowchart of an example of operation of the projector.

FIG. 3 is a flowchart of an example of operation of projector 1.

When projector 1 is activated, LD light emission timing corrector 16 carries out the calibration process. For example, projector 1 has a switch, not shown, for switching on its power supply. When the switch is turned on, LD light emission timing corrector 16 judges that projector 1 is activated, and carries out the calibration process.

According to the calibration process, LD light emission timing corrector 16 adjusts the scanning amplitude of projection unit 13 and sets the adjusted scanning amplitude in LD light emission signal generator 15 (step S31). A scanning area of screen 10 is now determined, determining the size of a display image.

Then, LD light emission timing corrector 16 controls LD light emission signal generator 15 to perform a phase matching process for bringing the horizontal scanning frequency of projection unit 13 and the horizontal synchronizing signal of the input video signal into synchronism with each other (step S32).

Thereafter, LD light emission timing corrector 16 controls LD light emission signal generator 15 to drive LD light emitter 12 and projection unit 13 to perform a prescribed scanning process on screen 10. Based on a PD detection signal 53 generated in the prescribed scanning process, LD light emission timing corrector 16 determines the start-of-emission timing and the light emission period of LD light emitter 12 at the time that an image is displayed.

More specifically, LD light emission timing corrector 16 causes signal generator 15 to control LD light emitter 12 to emit a continuous light beam having a prescribed light intensity, and to drive projection unit 13 at the scanning amplitude and the scanning frequency that have been set in steps S31, S32 to scan screen 10 for at least one image with the continuous light beam emitted from LD light emitter 12.

Then, based on the PD detection signal 53 from PD light detector 14, LD light emission timing corrector 16 calculates width periods of respective color stripes 21 and width periods of respective black stripes 22. Based on the calculated width periods, LD light emission timing corrector 16 determines a start-of-emission timing and a light emission period for applying a light pulse to each color stripe 21.

Figure 4:
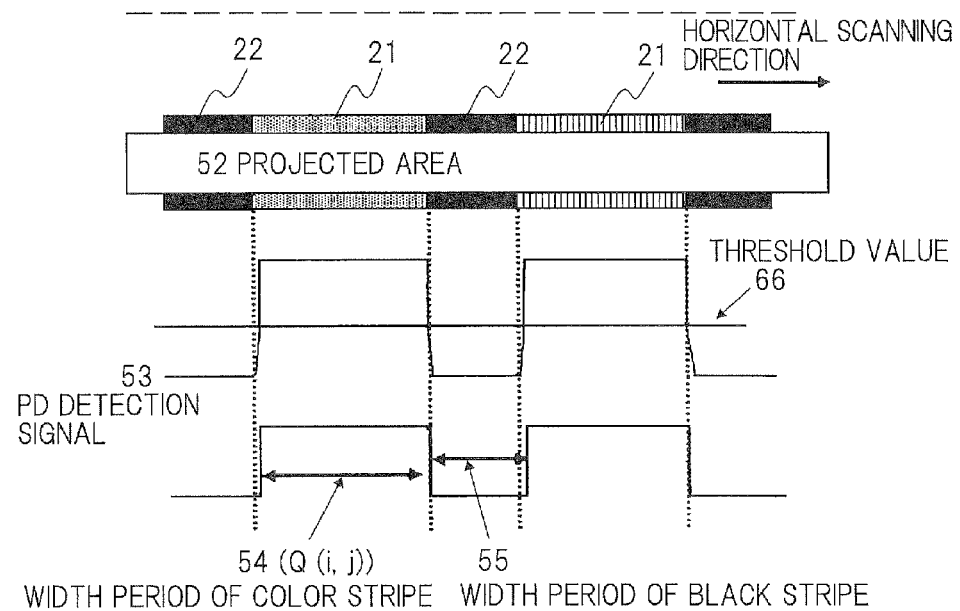
FIG. 4 is a diagram illustrative of the width periods of color stripes.

FIG. 4 is a diagram illustrative of the width periods of the color stripes and the width periods of the black stripes. In FIG. 4, it is assumed that a continuous light beam depending on a continuous-light-beam LD light emission signal 51 is emitted from LD light emitter 12. As shown in FIG. 4, while projected area 52 that is produced on screen 10 by the continuous light beam is going across color stripe 21, fluorescence generated by color stripe 21 is detected as feedback light by PD light detector 14. When the continuous light beam hits black stripe 22, the detection of the feedback light by PD light detector 14 is finished. A period during which the continuous light beam runs across color stripe 21 and its feedback light is detected by PD light detector 14 is referred to as width period 54 of color stripe 21, and a period during which the continuous light beam runs across black stripe 22 and no feedback light is detected by PD light detector 14 is referred to as width period 55 of black stripe 22.

For example, a start-of-emission timing is determined for each period that represents the sum of the width period 54 of each color stripe 21 and width period 55 of each black stripe 22. The light emission period is shorter than the width period of a color stripe.

Referring back to FIG. 3, after having determined a start-of-emission timing and a light emission period, LD light emission timing corrector 16 sets control information representing the start-of-emission timing and the light emission period in LD light emission signal generator 15, and finishes the calibration process (step S33).

Depending on the settings established in steps S31 through S33 and the input video signal, LD light emission signal generator 15 drives LE light emitter 12 and projection unit 13, which scans screen 10 with a laser beam to display an image depending on the input video signal on screen 10 (step S34).

Details of the operation of projector 1 in step S34 will be described below.

In step S34, LD light emission signal generator 15 generates a scanning drive signal depending on the scanning amplitude and the scanning frequency which have been set in steps S31, S32, determines the light emission intensity depending on the luminance value of the input video signal, and generates an LD light emission signal representing the light emission intensity and the start-of-emission timing and the light emission period which have been set in step S33.

The LE emission signal comprises a plurality of pulse signals corresponding respectively to light pulses to be applied to respective color stripes 21. Each of the light pulses has a positive-going timing indicating the start-of-emission timing, a pulse duration indicating the light emission period, and an amplitude indicating the light emission intensity. The interval between the positive-going timings of adjacent pulse signals represents a light emission interval of LD light emitter 12.

LD light emission signal generator 15 inputs the scanning drive signal to projection unit 13, and inputs the LD light emission signal to LD light emitter 12 and LD light emission timing corrector 16. LD light emitter 12 emits a laser beam depending on the LD light emission signal. Depending on the scanning drive signal, projection unit 13 is energized to scan the rear surface of screen 10 with the laser beam from LD light emitter 12, displaying an image on screen 10.

Figure 5:
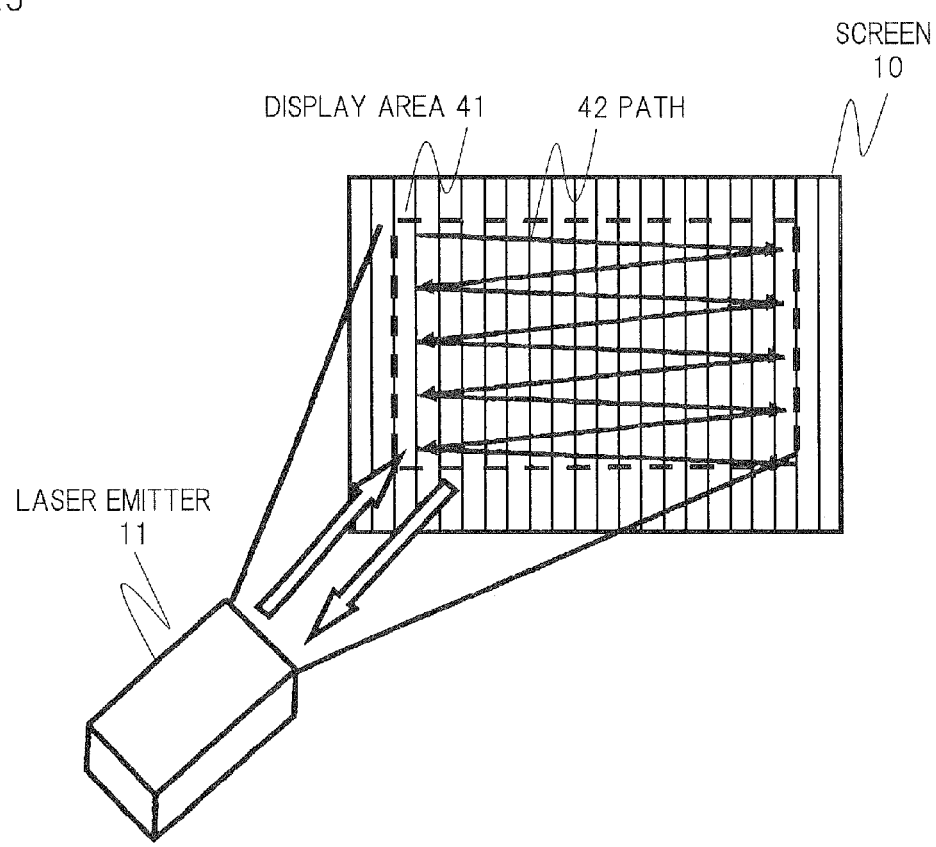
FIG. 5 is a view showing the manner in which the screen is scanned.

FIG. 5 is a view showing the manner in which screen 10 is scanned with the laser beam depending on the input video signal.

In FIG. 5, a plotting start position for starting to plot an image is at the upper left corner of display area 41. Projection unit 13 sweeps the laser beam in one direction and back for each scanning stroke to produce one line of a displayed image at a time. The laser beam projected onto screen 10 thus moves on screen 10 across the longitudinal directions of color stripes 21. As indicated by path 42, the incident position of the laser beam on screen 10 moves from the left end toward the right end of the display area. When the incident position of the laser beam reaches the right end, it moves back toward the right end. The incident position of the laser beam then moves back from the left end toward the right end again. The above scanning sequence is successively carried out from the upper end toward the lower end of screen 10.

The light pulses applied to color stripes 21 generate fluorescence. Part of the fluorescence is diffused toward the front surface of screen 10, forming an image thereon. Part of the fluorescence returns toward laser emitter 11, where it is detected as feedback light by PD light detector 14. PD light detector 14 outputs a PD detection signal 53 representing the light intensity of the feedback light to LD light emission timing corrector 16.

Based on the LE emission signal from LD light emission signal generator 15 and the PD detection signal from PD light detector 14, LD light emission timing corrector 16 adjusts the start-of-emission timing of LD light emitter 12 to correct the incident position of each light pulse on screen 10.

Details of the correction of the start-of-emission timing will be described below.

When an image is displayed, the light emission intensity of LD light emitter 12 varies depending on the luminance value of the input video signal, and hence the light intensity on the scanning element of projection unit 13 varies. Therefore, the temperature of the scanning element of projection unit 13 varies, resulting in variations in characteristics of the scanning element, such as the scanning frequency. When the characteristics of the scanning element vary, the incident position of the laser beam on screen 10 may vary even though the start-of-emission timing remains the same. Consequently, even if the start-of-emission timing of LD light emitter 12 is set to an appropriate value by the calibration process so that projected areas that are produced by the respective light pulses fall in respective color stripes 21, the start-of-emission timing may deviate from the appropriate value when an image is displayed.

Figure 6:
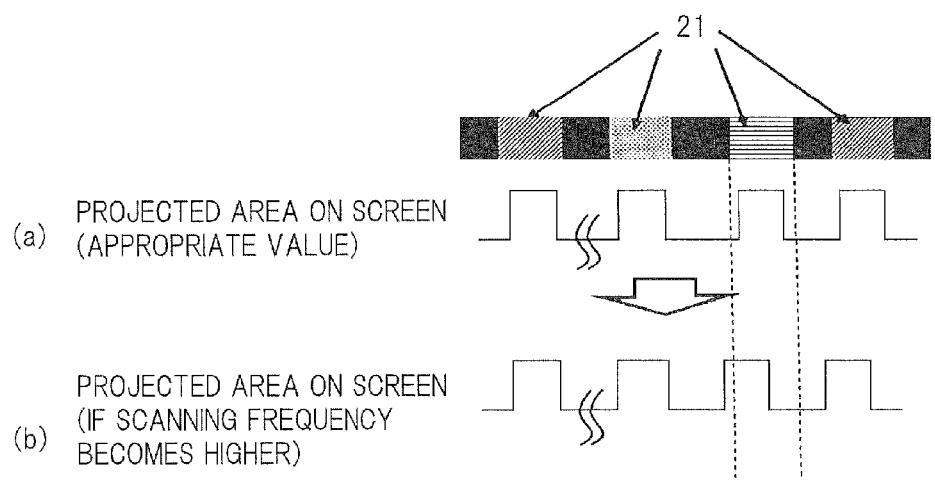
FIG. 6 is a diagram showing an example of areas of the screen onto which light pulses are projected.

For example, as shown by a projected state (a) in FIG. 6, it is assumed that the start-of-emission timing is set to an appropriate value by the calibration process so that projected areas produced by the respective light pulses fall in respective color stripes 21. When an image is displayed, if the temperature of the scanning element varies, lowering the scanning speed of the scanning element, then as shown by a projected state (b) in FIG. 6, light pulses tend to deviate from corresponding color stripes 21.

LD light emission timing corrector 16 adjusts the start-of-emission timing of LD light emitter 12 in order to keep the projected areas produced by respective light pulses within color stripes 21.

According to an adjustment process for adjusting the start-of-emission timing of LD light emitter 12, for example, LD light emission timing corrector 16 determines a start-of-detection timing and a detection period of each feedback light pulse based on the PD detection signal. Based on the start-of-detection timing and the detection period of each feedback light pulse, LD light emission timing corrector 16 corrects the light emission period indicated by the control signal held by LD light emission signal generator 15, thereby correcting a start-of-emission timing of LD light emitter 12. At this time, LD light emission timing corrector 16 should preferably correct a next start-of-emission timing of LD light emitter 12 by correcting the control information to fall in a time which is shorter than the time from an end of the light emission of LD light emitter 12 to the next start-of-emission timing.

Figure 7:
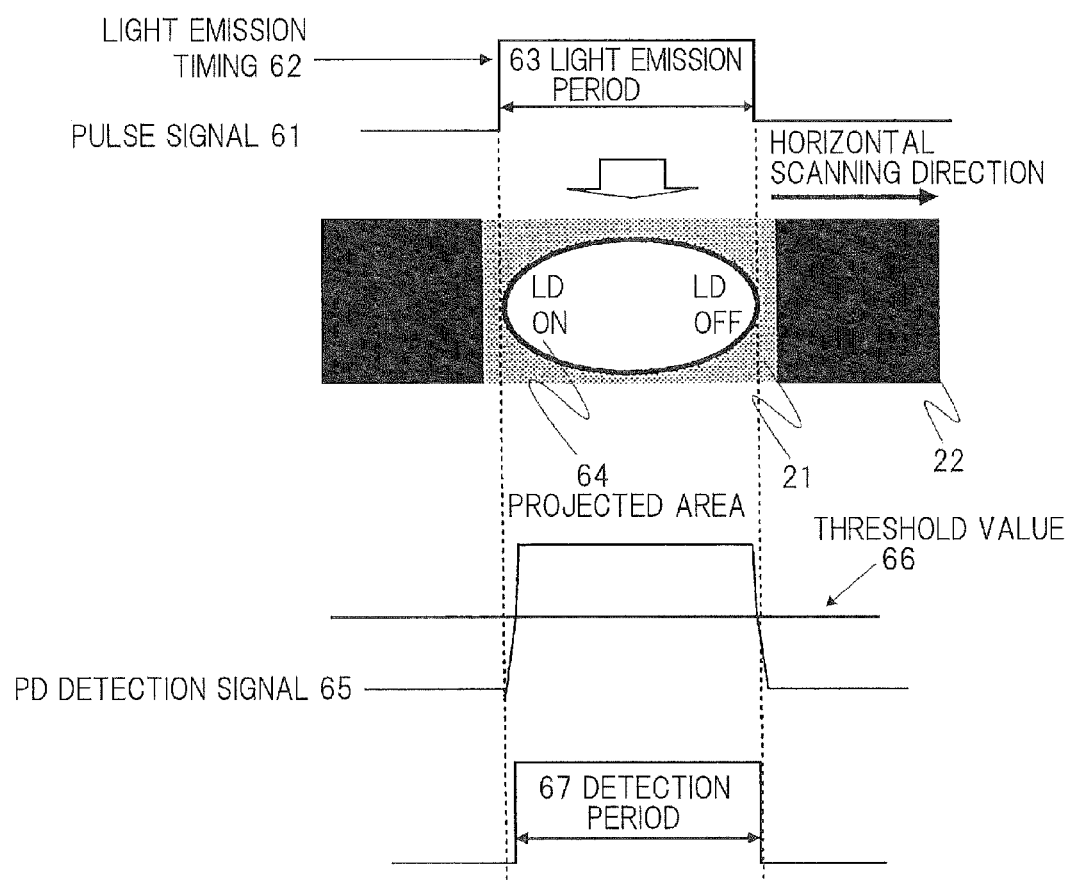
FIG. 7 is a diagram illustrative of principles of an adjustment process for adjusting a start-of-emission timing of an LD light emitter.
Figure 8:
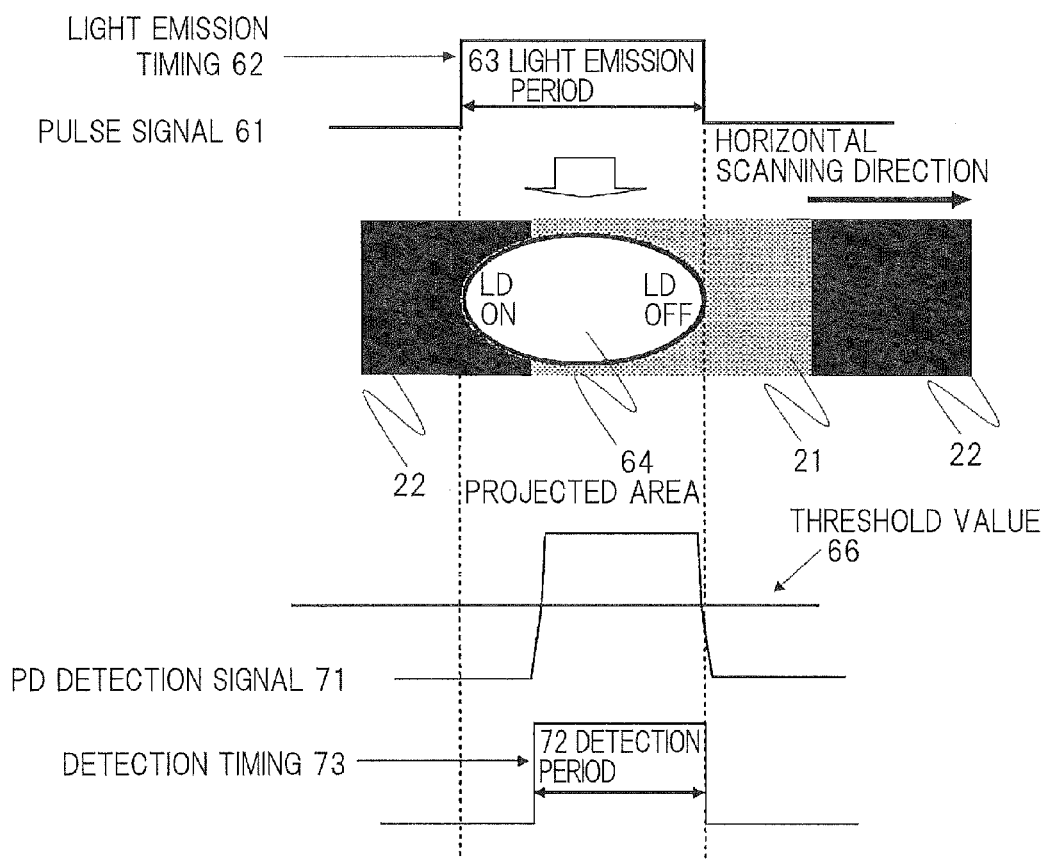
FIG. 8 is a diagram illustrative of principles of the adjustment process for adjusting the start-of-emission timing of the LD light emitter.
Figure 9:
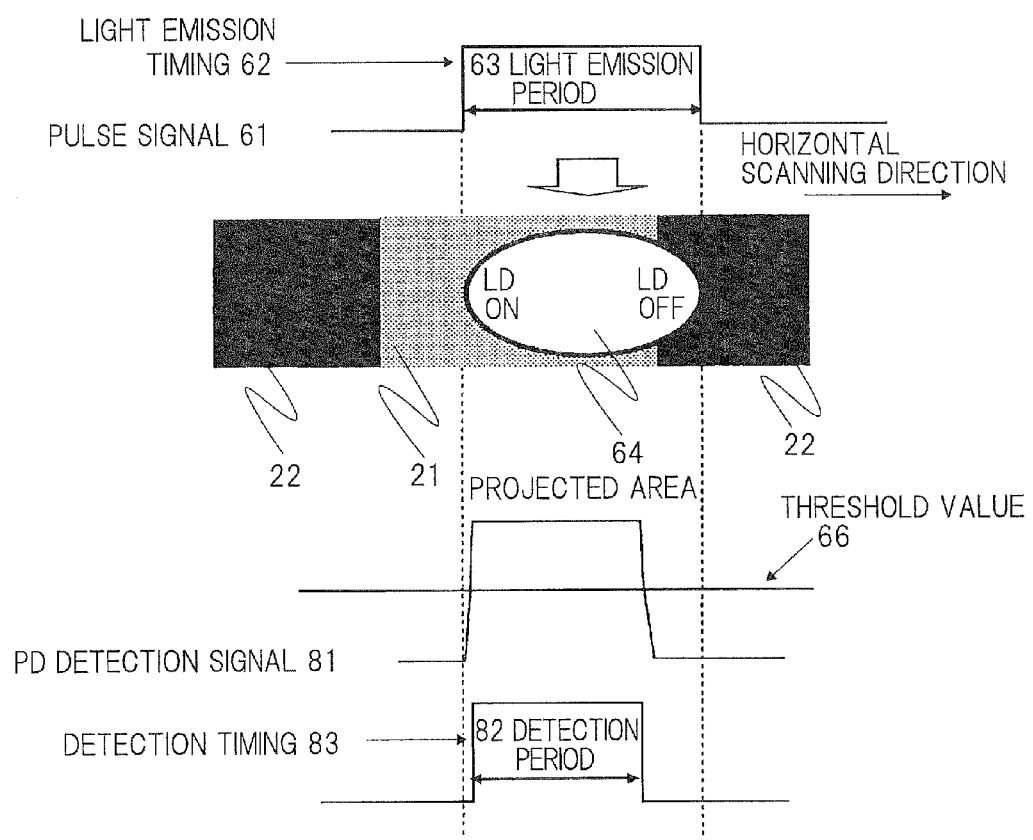
FIG. 9 is a diagram illustrative of principles of the adjustment process for adjusting the start-of-emission timing of the LD light emitter.

FIGS. 7 through 9 are illustrative of principles of the above adjustment process. In FIGS. 7 through 9, it is assumed that a light pulse depending on pulse signal 61 of the LD light emission signal is emitted from LD light emitter 12. The positive-going timing of pulse signal 61 represents start-of-emission timing 62 of LD light emitter 12, and the pulse duration of pulse signal 61 represents light emission period 63 of LD light emitter 12.

As shown in FIG. 7, if projected area 64 produced on screen 10 by a light pulse based on pulse signal 61 falls within color stripe 21, then immediately when the light pulse is applied to screen 10, fluorescence from color stripe 21 is detected as feedback light by PD light detector 14, and immediately when the light pulse stops being emitted, the detection of the feedback light by PD light detector 14 is finished. Therefore, PD light detector 14 outputs PD detection signal 65 whose positive-going time and negative-going time are essentially in agreement with those of pulse signal 61.

If the period, during which the value of PD detection signal 65 is equal to or greater than threshold value 66, is regarded as detection period 67 during which the feedback light is detected, then detection period 67 is essentially in agreement with light emission period 63 of LD light emitter 12. When detection period 67 of PD light detector 14 is essentially in agreement with light emission period 63 of LD light emitter 12, there is no need to correct a next start-of-emission timing.

As shown in FIGS. 8 and 9, if projected area 64 produced on screen 10 by a light pulse based on pulse signal 61 falls outside color stripe 21, then the detection period during which PD light detector 14 detects the feedback light is much shorter than light emission period 63 of LD light emitter 12.

Specifically, as shown in FIG. 8, if start-of-emission timing 62 of LD light emitter 12 is too early, placing projected area 64 produced by a light pulse partly on black stripe 22 that precedes color stripe 21, then no feedback light is detected until projected area 64 produced by the light pulse shifts from black stripe 22 into color stripe 21. Therefore, PD light detector 14 outputs PD detection signal 71 whose positive-going timing is later than pulse signal 61 and whose negative-going timing is essentially in agreement with pulse signal 61.

The period during which the value of PD detection signal 71 is equal to or greater than threshold value 66 is regarded as detection period 72 during which the feedback light is detected by PD light detector 14, and the timing at which the value of PD detection signal 71 becomes equal to threshold value 66 is regarded as start-of-detection timing 73 at which the feedback light is detected by PD light detector 14. Detection period 72 is much shorter than light emission period 63 of LD light emitter 12, and start-of-detection timing 73 is much later than start-of-emission timing 62 of LD light emitter 12. Therefore, if detection period 72 is much shorter than light emission period 63 and if start-of-detection timing 73 is much later than start-of-emission timing 62, then it is necessary to retard a next start-of-emission timing of LD light emitter 12.

As shown in FIG. 9, if start-of-emission timing 62 of LD light emitter 12 is too late, placing projected area 64 produced by a light pulse partly on black stripe 22 that follows color stripe 21, then no feedback light is detected when projected area 64 produced by the light pulse shifts off color stripe 21. Therefore, PD light detector 14 outputs PD detection signal 71 whose positive-going timing is essentially in agreement with pulse signal 61 and whose negative-going timing is earlier than pulse signal 61.

The period during which the value of PD detection signal 81 is equal to or greater than threshold value 66 is regarded as detection period 82 during which the feedback light is detected by PD light detector 14, and the timing at which the value of PD detection signal 81 becomes equal to threshold value 66 is regarded as start-of-detection timing 83 at which the feedback light is detected by PD light detector 14. Detection period 82 is much shorter than light emission period 63 of LD light emitter 12, and start-of-detection timing 83 is essentially in agreement with start-of-emission timing 62 of LD light emitter 12. Therefore, if detection period 82 is much shorter than light emission period 63 and start-of-detection timing 83 is essentially in agreement with start-of-emission timing 62, then it is necessary to retard a next start-of-emission timing of LD light emitter 12.

Figure 10:
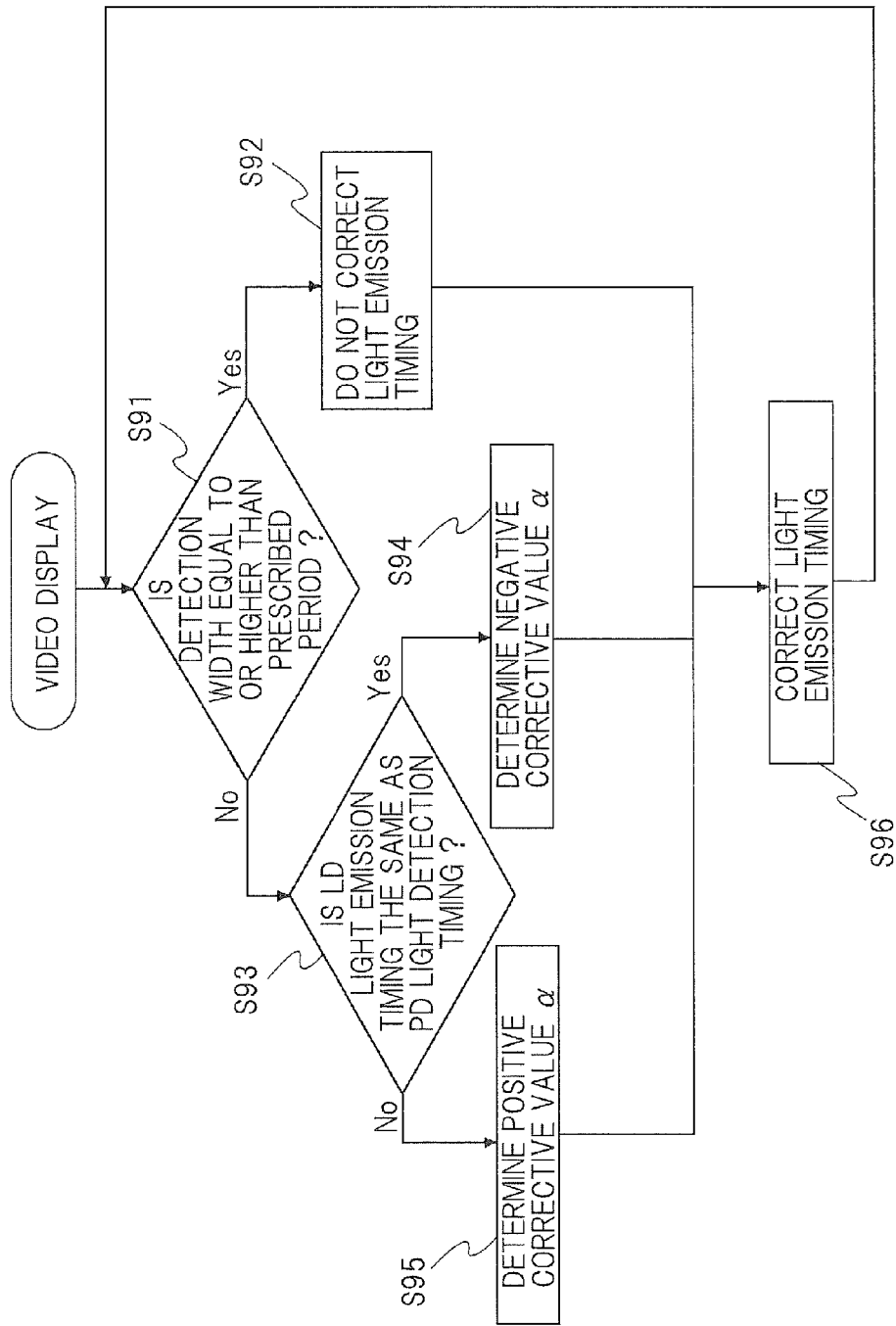
FIG. 10 is a flowchart of the adjustment process for adjusting the start-of-emission timing of the LD light emitter.

FIG. 10 is a flowchart of the adjustment process for adjusting the start-of-emission timing of LD light emitter 12. It is assumed that LD light emission signal generator 15 inputs pulse signals to LD light emitter 12 and LD light emission timing corrector 16, and also inputs a scanning drive signal to projection unit 13 to display an image on screen 10.

First, LD light emission timing corrector 16 receives a PD detection signal from PD light detector 14 and an LD light emission signal from LD light emission signal generator 15. LD light emission timing corrector 16 determines a period during which the value of the PD detection signal is equal to or higher than a threshold value as a detection period of PD light detector 14, and judges whether or not the detection period is equal to or greater than a prescribed period (step S91). The prescribed period is the same as or slightly shorter than the light emission period of LD light emitter 12, and is preset in LD light emission timing corrector 16.

If the detection period is equal to or greater than the prescribed period, then since the projected area of a light pulse falls within color stripe 21, LD light emission timing corrector 16 decides that there is no need to correct the start-of-emission timing of LD light emitter 12, generates a corrective signal representing 0, and outputs the corrective signal to LD light emission signal generator 15 (step S92).

If the detection period is shorter than the prescribed period, then since the projected area of a light pulse falls outside color stripe 21, LD light emission timing corrector 16 decides that there is a need to correct the start-of-emission timing of LD light emitter 12, and perform a process of correcting a next start-of-emission timing of LD light emitter 12 based on the start-of-detection timing of PD light detector 14.

More specifically, LD light emission timing corrector 16 regards the timing at which the value of the PD detection signal becomes equal to or greater than the threshold value as the start-of-detection timing of PD light detector 14, and also regards the positive-going timing of the LD light emission signal as the start-of-emission timing of LD light emitter 12. LD light emission timing corrector 16 judges whether or not the difference between those timings is equal to or greater than a prescribed value, thereby judging whether the start-of-emission timing is too early or too late (step S93).

If the difference between the start-of-detection timing and the start-of-emission timing is smaller than the prescribed value, then since the timings are essentially in agreement with each other, LD light emission timing corrector 16 decides that the start-of-emission timing of LD light emitter 12 is too late, and determines a first corrective value for advancing the start-of-emission timing. Then, LD light emission timing corrector 16 generates a corrective signal representing the first corrective value, and outputs the corrective signal to LD light emission signal generator 15 (step S94).

The first corrective value is a negative value, and a first corrective quantity α which represents the magnitude (absolute value) of the first corrective value is expressed as:

$$\alpha = (N - V(i, j)) + \frac{Q(i, j) - N}{2} \quad \text{[Equation 1]}$$

where N represents the light emission period of LD light emitter 12, Q(i,j) the width period of jth color stripe 21 on an ith line to which a light pulse is applied, and V(i,j) the detection period for feedback light from jth color stripe 21 on the ith line. Q(i,j) may remain the same for all the color stripes.

If the difference between the start-of-detection timing and the start-of-emission timing is equal to or greater than the prescribed value, then since the timings are significantly different from each other, LD light emission timing corrector 16 decides that the start-of-emission timing of LD light emitter 12 is too early, and determines a second corrective value for retarding the start-of-emission timing. Then, LD light emission timing corrector 16 generates a corrective signal representing the second corrective value, and outputs the corrective signal to LD light emission signal generator 15 (step S95). The second corrective value is a positive value, and a second corrective quantity representing the magnitude of the second corrective value is the same as the first corrective quantity α.

In response to the corrective signal, LD light emission signal generator 15 adds the corrective value represented by the corrective signal to the light emission interval represented by the control information, thereby correcting the start-of-emission timing (step S96). Consequently, if the difference between the start-of-detection timing and the start-of-emission timing is smaller than the prescribed value, since the corrective value represented by the corrective signal is a negative value, the light emission interval becomes shorter, resulting in an advanced start-of-emission timing. If the difference between the start-of-detection timing and the start-of-emission timing is equal to or greater than the prescribed value, since the corrective value represented by the corrective signal is a positive value, the light emission interval becomes longer, resulting in a retarded start-of-emission timing.

Thereafter, LD light emission signal generator 15 inputs an LD light emission signal representing the corrected start-of-emission timing to LD light emitter 12 and LD light emission timing corrector 16, continuing to display the image and causing LD light emission timing corrector 16 to carry out step S91 again.

According to the present exemplary embodiment, as described above, the start-of-emission timing of LD light emitter 12 is adjusted based on the start-of-detection timing and the detection period of the feedback light which is visible light from the color stripes. Therefore, it is possible to adjust the incident positions of the light pulses on the screen without the use of a special screen having servo reference marks between the color stripes.

Inasmuch as the start-of-emission timing is adjusted based on the start-of-detection timing and the detection period of the feedback light with respect to each of the feedback light pulses, the start-of-emission timing can be adjusted according to a fine adjustment process.

A second exemplary embodiment of the present invention will be described below.

The corrective values according to the present exemplary embodiment are different from those according to the first exemplary embodiment.

If the difference between the start-of-detection timing of PD light detector 14 and the start-of-emission timing of LD light emitter 12 is smaller than the prescribed value, i.e., if the start-of-emission timing of LD light emitter 12 is too late, then LD light emission timing corrector 16 determines a first corrective quantity α1 which represents the magnitude of a first corrective value as follows:

$$\alpha 1 = (N - V(i,j)) \quad \text{[Equation 2]}$$

Figure 11:
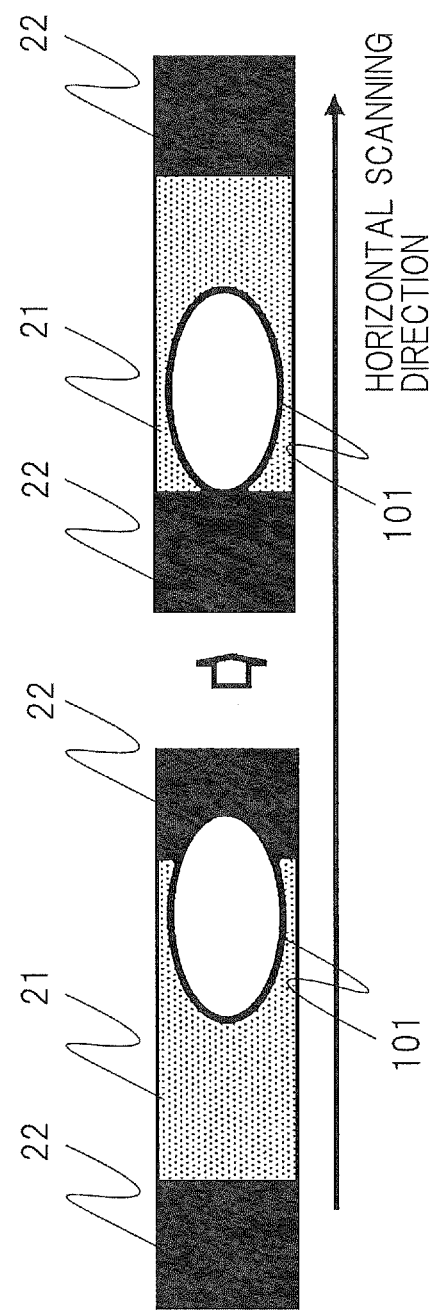
FIG. 11 is a diagram showing another example of areas of the screen onto which light pulses are projected.

In this case, as shown in FIG. 11, projected area 101 of a light pulse is shifted toward a preceding pixel while falling within color stripe 21. Therefore, even if the start-of-emission timing of LD light emitter 12 tends to be late, it is possible to increase the period during which the projected area of a light pulse falls within color stripe 21.

If the difference between the start-of-detection timing of PD light detector 14 and the start-of-emission timing of LD light emitter 12 is equal to or greater than the prescribed value, i.e., if the start-of-emission timing of LD light emitter 12 is too early, then LD light emission timing corrector 16 determines a second corrective quantity α2 which represents the magnitude of a second corrective value as follows:

$$\alpha 2=(N-V(i,j))+(Q(i,j)-N)=Q(i,j)-V(i,j) \qquad \text{[Equation 3]}$$

Figure 12:
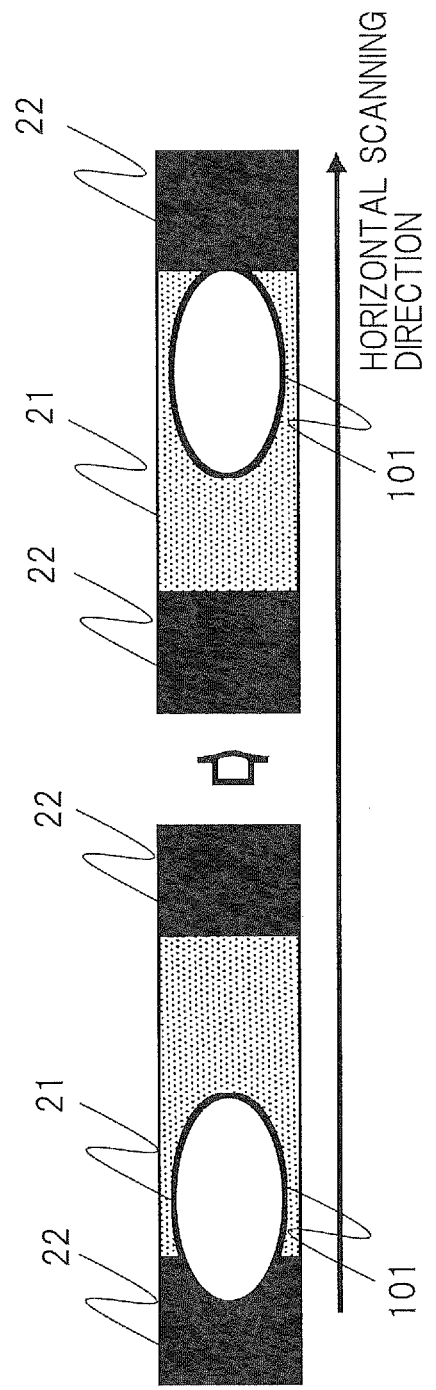
FIG. 12 is a diagram showing still another example of areas of the screen onto which light pulses are projected.

In this case, as shown in FIG. 12, projected area 101 of a light pulse is shifted toward the following pixel while falling within color stripe 21. Therefore, even if the start-of-emission timing of LD light emitter 12 tends to be early, it is possible to increase the period during which the projected area of a light pulse falls within color stripe 21.

According to the present exemplary embodiment, as described above, if the start-of-emission timing of LD light emitter 12 is too late, then the projected area of a light pulse is shifted toward the preceding pixel, and if the start-of-emission timing of LD light emitter 12 is too early, then the projected area of a light pulse is shifted toward the following pixel. Therefore, it is possible to increase the period during which the projected area of a light pulse falls within color stripe 21, thereby making the adjustment of start-of-emission timings less frequent.

The first corrective quantity may be determined from Equation 1 and the second corrective quantity may be determined from Equation 3, or the first corrective quantity may be determined from Equation 2 and the second corrective quantity may be determined from Equation 3.

A third exemplary embodiment of the present invention will be described below.

As described above with reference to FIG. 5, since projection unit 13 sweeps the laser beam in one direction and back for each scanning stroke, a light pulse, which is emitted at a start-of-emission timing that has been adjusted based on the detection period and the start-of-detection timing of the feedback light immediately before the laser beam, is swept back is applied to color stripe 21 after the laser beam has been swept back.

Figure 13:
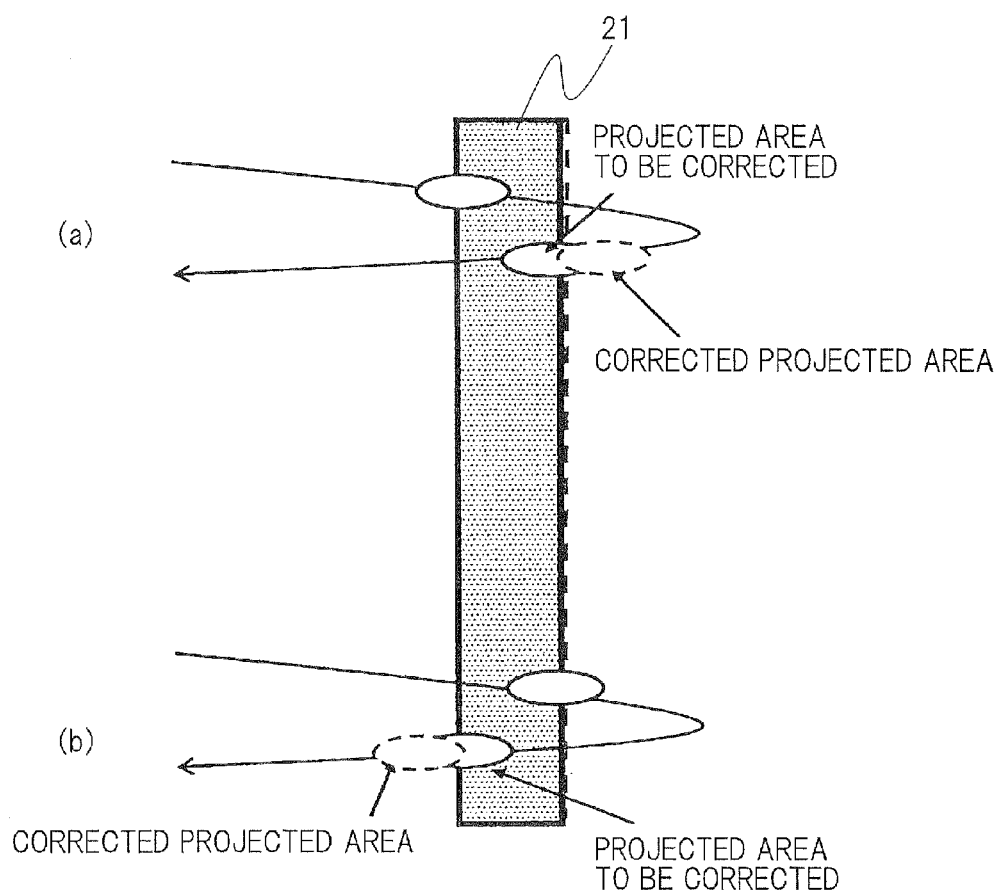
FIG. 13 is a diagram showing yet another example of areas of the screen onto which light pulses are projected.

Therefore, if the start-of-emission timing of a light pulse which is applied to last color stripe 21 along a horizontal scanning direction is early, then, as shown in FIG. 13(a), the start-of-emission timing of a next light pulse which is applied to color stripe 21 is retarded. Consequently, if the start-of-emission timing of a light pulse which is applied to last color stripe 21 is early, when the start-of-emission timing of a next light pulse which is applied to color stripe 21 is retarded, the light emission timing becomes further later than the appropriate value.

Similarly, if the start-of-emission timing of a light pulse which is applied to last color stripe 21 along a horizontal scanning direction is late, then, as shown in FIG. 13(b), the start-of-emission timing of a next light pulse which is applied to color stripe 21 is advanced. Consequently, if the start-of-emission timing of a light pulse which is applied to last color stripe 21 is late, when the start-of-emission timing of a next light pulse which is applied to color stripe 21 is advanced, the light emission timing becomes further earlier than the appropriate value.

Therefore, provided that the nearest start-of-emission timing is a light emission timing immediately before the laser beam is swept back, if the difference between the start-of-emission timing and the start-of-detection timing is equal to or greater than the prescribed value, then LD light emission timing corrector 16 advances a next start-of-emission timing by the first corrective quantity, and if the above difference is smaller than the prescribed value, then LD light emission timing corrector 16 retards a next start-of-emission timing by the second corrective quantity. Provided that the nearest start-of-emission timing is a light emission timing immediately before the laser beam is swept back, if the above difference is equal to or greater than the prescribed value, then LD light emission timing corrector 16 retards a next start-of-emission timing by the first corrective quantity, and if the above difference is smaller than the prescribed value, then LD light emission timing corrector 16 advances a next start-of-emission timing by the second corrective quantity, as is the case with the first and second exemplary embodiments.

For example, LD light emission timing corrector 16 holds a count representing the number of times that LD light emitter 12 emits light pulses per horizontal scanning stroke, and judges whether the nearest start-of-emission timing is a light emission timing immediately before the laser beam is swept back, based on the count.

If the nearest start-of-emission timing is not a light emission timing immediately before the laser beam is swept back, then LD light emission timing corrector 16 determines a corrective value and outputs a corrective signal in the same manner as the first exemplary embodiment. If the nearest start-of-emission timing is a light emission timing immediately before the laser beam is swept back, then LD light emission timing corrector 16 determines a corrective value in the same manner as the first exemplary embodiment or the second exemplary embodiment, and inverts the sign of the corrective value. LD light emission timing corrector 16 then outputs a corrective signal representing the corrective value with the inverted sign.

According to the present exemplary embodiment, as described above, even when the laser beam is swept back, the projected area of the laser beam on screen 10 can be adjusted to an appropriate position.

A fourth exemplary embodiment of the present invention will be described below.

According to the present exemplary embodiment, LD light emission signal generator 15 adjusts a start-of-writing timing, which represents a first start-of-emission timing of LD light emitter 12 in the horizontal scanning process carried out along the horizontal scanning direction by projection unit 13, depending on a start-of-scanning timing represented by a horizontal scanning reference signal which is a reference signal for the horizontal scanning process carried out by projection unit 13.

Figure 14:
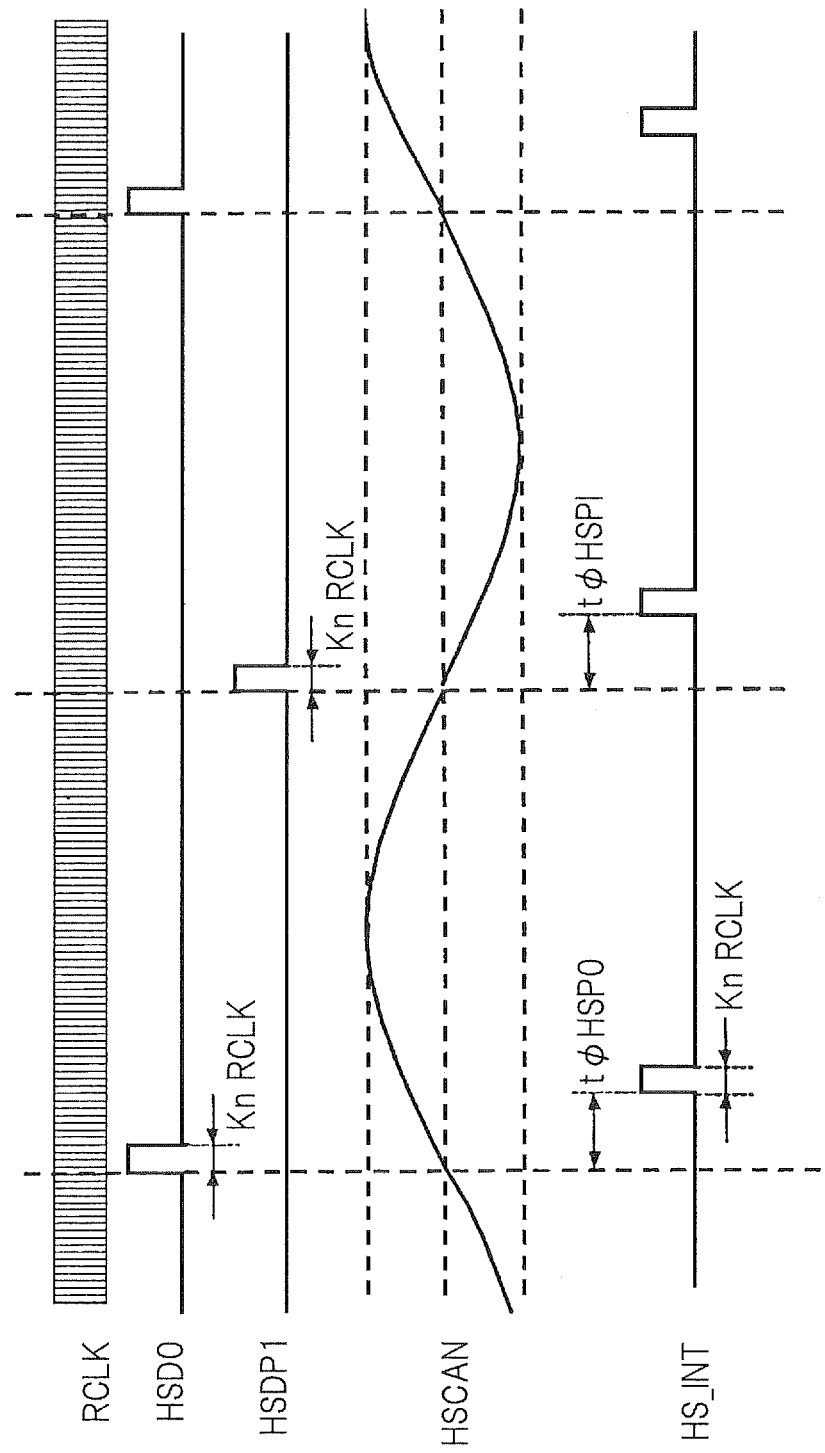
FIG. 14 is a diagram showing a start-of-writing timing to start a writing process of the LD light emitter.
Figure 15:
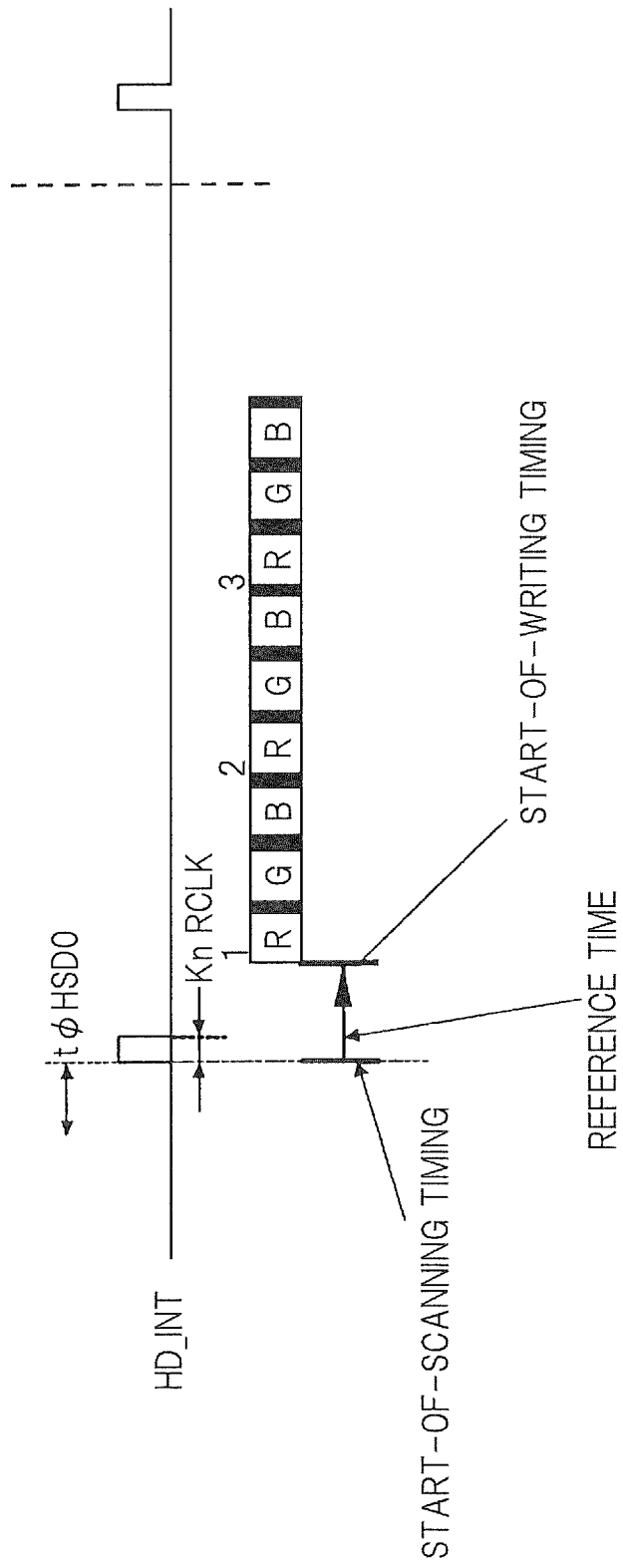
FIG. 15 is a diagram showing the start-of-writing timing to start the writing process of the LD light emitter.

FIGS. 14 and 15 are diagrams showing a start-of-writing timing to start a writing process of LD light emitter 12. In FIGS. 14 and 15, RCLK indicates a clock signal of projector 1, HSD0 and HSDPI horizontal synchronizing signals of the input video signal, HSCAN a horizontal scanning drive signal, and HD_INT a horizontal scanning reference signal.

Horizontal synchronizing signal HSD0 is a pulse signal for determining a reference value for the angle of a horizontal scanning element included in projection unit 13 for a first horizontal scanning direction, and horizontal synchronizing signal HSDPI is a pulse signal for determining a reference value for the angle of the horizontal scanning element included in projection unit 13 for a first horizontal scanning direction. The first and second horizontal scanning directions are opposite to each other. The pulses of horizontal synchronizing signals HSD0, HSDPI have a pulse duration as long as kn periods of clock signal RCLK where kn represents a positive integer.

Horizontal scanning drive signal HSCAN is a sine-wave signal whose half period spans from the positive-going timing of horizontal synchronizing signal HSD0 to the negative-going timing of horizontal synchronizing signal HSDPI. The value of horizontal scanning drive signal HSCAN represents the speed of movement of the horizontal scanning element.

Horizontal scanning reference signal HD_INT is a pulse signal for determining a start-of-scanning timing in the horizontal direction. Horizontal scanning reference signal HD_INT has a positive-going edge in the first horizontal scanning direction which is first prescribed time t☐HSD0 later than the positive-going timing of horizontal synchronizing signal HSD0, and a positive-going edge in the second horizontal scanning direction which is second prescribed time t☐HSDPI later than the positive-going timing of horizontal synchronizing signal HSDPI. Horizontal scanning reference signal HD_INT has a pulse duration as long as kn periods of clock signal RCLK. Prescribed times t☐HSD0, t☐HSDPI are determined by a calibration.

LD light emission timing corrector 16 sets control information representing a reference time, which is a time from the start-of-scanning timing to the start-of-writing timing, in addition to the start-of-emission timing and the light emission period of LD light emitter 12, in LD light emission signal generator 15 according to the calibration process.

LD light emission signal generator 15 then generates, at a start-of-writing timing, an LD light emission signal indicating, as a light emission timing, the time at which a reference time represented by the control information has elapsed from the start-of-scanning timing, i.e., the positive-going timing of horizontal scanning reference signal HD_INT, as shown in FIG. 15, and outputs the LD light emission signal to LD light emitter 12, thereby adjusting the start-of-emission timing of LD light emitter 12. In FIG. 15, the start-of-writing timing corresponds to color stripe 21A for generating red fluorescence from the first pixel.

If the nearest start-of-emission timing is a light emission timing immediately before the laser beam is swept back, then LD light emission timing corrector 16 corrects the reference time represented by the control information held by LD light emission signal generator 15, based on the start-of-detection timing and the detection period of LD light detector 14, thereby correcting the start-of-emission timing of LD light emitter 12.

According to the present exemplary embodiment, since the reference time from the start-of-scanning timing represented by the horizontal scanning reference signal, the first start-of-emission timing of LD light emitter 12 in the scanning process along the horizontal scanning directions can be cause fewer errors than if the light emission interval of LD light emitter 12 is corrected.

A fifth exemplary embodiment of the present invention will be described below.

According to the present exemplary embodiment, there is provided another process of judging whether the start-of-emission timing is too early or too late.

According to the first exemplary embodiment, as described above with respect to step S93, LD light emission timing corrector 16 judges whether the start-of-emission timing is too early or too late based on the start-of-detection timing of PD light detector 14 and the start-of-emission timing of LD light emitter 12. According to the present exemplary embodiment, LD light emission timing corrector 16 judges whether the start-of-emission timing is too early or too late based on the end-of-detection timing of PD light detector 14 and the end-of-emission timing of LD light emitter 12.

Specifically, LD light emission timing corrector 16 regards the timing at which the value of the PD detection signal becomes smaller than the threshold value as the end-of-detection timing of PD light detector 14, and also regards the negative-going timing of the LD light emission signal as the end-of-emission timing of LD light emitter 12. LD light emission timing corrector 16 judges whether or not the difference between those timings is equal to or greater than a prescribed value, thereby judging whether the start-of-emission timing is too early or too late.

If the difference between the end-of-detection timing and the end-of-emission timing is equal to or greater than the prescribed value, then LD light emission timing corrector 16 decides that the start-of-emission timing of LD light emitter 12 is too late, and advances the start-of-emission timing by a first corrective value. If the difference between the end-of-detection timing and the end-of-emission timing is smaller than the prescribed value, then LD light emission timing corrector 16 decides that the start-of-emission timing of LD light emitter 12 is too early, and retards the start-of-emission timing by a second corrective value. The first corrective value and the second corrective value may be the same as the values described in the first exemplary embodiment or the same as the values described in the second exemplary embodiment.

According to the present exemplary embodiment, it is also possible to appropriately correct the start-of-emission timing of LD light emitter 12.

The judging process according to the present exemplary embodiment may be applied to the third exemplary embodiment. In this case, provided that the nearest start-of-emission timing is a light emission timing immediately before the laser beam is swept back, if the difference between the start-of-emission timing and the start-of-detection timing is smaller than the prescribed value, then LD light emission timing corrector 16 advances a next start-of-emission timing by the first corrective quantity, and if the above difference is equal to or greater than the prescribed value, then LD light emission timing corrector 16 retards a next start-of-emission timing by the second corrective quantity.

In each of the exemplary embodiments described above, the illustrated arrangement is by way of example only, and the present invention is not limited to the illustrated arrangement.

For example, the light source which has been illustrated as an LD device may comprise a solid-state laser device or a gas laser device.

In the adjustment process for adjusting the start-of-emission timing of LD light emitter 12, LD light emission timing corrector 16 is illustrated as correcting a next light emission timing of LD light emitter 12 based on the LD light emission signal and the PD detection signal. However, LD light emission timing corrector 16 may correct the light emission timing of LD light emitter 12 after a prescribed number of light emission timings.

In each of the exemplary embodiments, the longitudinal directions of color stripes 21 extend vertically, and laser emitter 11 scans screen 10 horizontally to move the incident position of the laser beam across the longitudinal directions of color stripes 21. However, the longitudinal directions of color stripes 21 and the scanning direction are not limited to those in the exemplary embodiments, but may be any directions insofar as the scanning direction extends across the longitudinal directions of color stripes 21.

Figure 16:
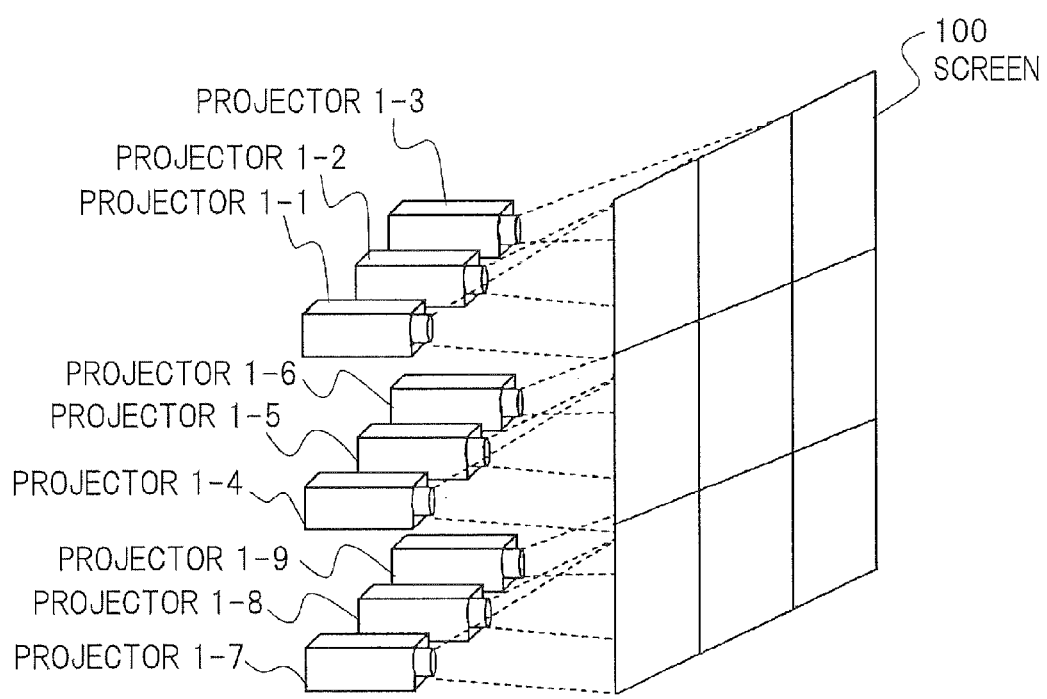
FIG. 16 is a view showing by way of example a multi-projector system.

Projector 1 may be each of projectors 1-1 through 1-9 of a multi-projector system. The multi-projector system displays an array of projected images from projectors 1-1 through 1-9 on a screen, forming a larger displayed image. The multi-projector system, which is illustrated as having nine projectors in FIG. 16, may have a plurality of projectors in reality.

If projector 1 is applied to a multi-projector system, then since projector 1 does not need to have special marks for generating feedback light in locations other than the display area, the multi-projector system may display seamless images with no seams at the boundaries of projected images.

This application is based upon and claims the benefit of priority from Japanese Patent Application No. 2011-38319 filed on Feb. 24, 2011, the entire disclosure of which is incorporated herein by reference.

The invention claimed is:

1. A projector comprising:
a screen having a periodic array of color stripes for producing visible light depending on incident light;
a light source that emits a light beam;
a projection unit that scans an area of said screen where said color stripes are disposed, with said light beam in a direction across said color stripes, to display an image on said screen;
a detector that detects the visible light from each of said color stripes as a feedback light pulse; and
a controller that adjusts a start-of-emission timing of said light source based on a start-of-detection timing at which the feedback light pulse is detected by said detector and a detection period during which the feedback light pulse is detected by said detector, and controlling said light source to emit said light beam in order to apply light pulses to said color stripes within boundaries thereof;
wherein the controller comprises:
a driver that holds control information representing emission intervals of said light source and energizes said light source based on said control information to emit the light pulses therefrom; and
a corrector that corrects the emission intervals represented by said control information based on said start-of-detection timing and said detection period to adjust said start-of-emission timing;
wherein said corrector adjusts said start-of-emission timing for each of said feedback light pulses based on said start-of-detection timing and said detection period of the feedback light pulse; and
wherein if said detection period of said feedback light is smaller than a prescribed period, said corrector adjusts said start-of-emission timing based on said start-of-detection timing of said feedback light.

2. The projector according to claim 1, wherein provided that said detection period is smaller than said prescribed period, if the difference between said start-of-detection timing of said feedback light and a nearest start-of-emission timing of said light source is smaller than a prescribed value, said corrector advances a next start-of-emission timing of said light source by a first corrective quantity, and if said difference is equal to or greater than said prescribed value, said corrector retards said next start-of-emission timing by a second corrective quantity.

3. The projector according to claim 2, wherein said projection unit sweeps said light beam in one direction and back for each scanning stroke;
provided that said nearest start-of-emission timing of said light source is not a start-of-emission timing immediately before said light beam is swept back, if said difference is equal to or greater than said prescribed value, said corrector advances said next start-of-emission timing by said first corrective quantity, and if said difference is smaller than said prescribed value, said corrector retards said next start-of-emission timing by said second corrective quantity; and
provided that said nearest start-of-emission timing of said light source is a start-of-emission timing immediately before said light beam is swept back, if said difference is equal to or greater than said prescribed value, said corrector retards said next start-of-emission timing by said first corrective quantity, and if said difference is smaller than said prescribed value, said corrector advances said next start-of-emission timing by said second corrective quantity.

4. The projector according to claim 1, wherein provided that said detection period is smaller than said prescribed period, if the difference between an end-of-detection timing of said feedback light and a nearest end-of-emission timing of said light source is equal to or greater than a prescribed value, said corrector advances a next start-of-emission timing of said light source by a first corrective quantity, and if said difference is smaller than said prescribed value, said corrector retards said next start-of-emission timing by a second corrective quantity.

5. The projector according to claim 4, wherein said projection unit sweeps said light beam in one direction and back for each scanning stroke;
provided that said nearest start-of-emission timing of said light source is not a start-of-mission timing immediately before said light beam is swept back, if said difference is smaller than said prescribed value, said corrector advances said next start-of-emission timing by said first corrective quantity, and if said difference is equal to or greater than said prescribed value, said corrector retards said next start-of-emission timing by said second corrective quantity; and
provided that said nearest start-of-emission timing of said light source is a start-of-mission timing immediately before said light beam is swept back, if said difference is smaller than said prescribed value, said corrector retards said next start-of-emission timing by said first corrective quantity, and if said difference is equal to or greater than said prescribed value, said corrector advances said next start-of-emission timing by said second corrective quantity.

6. The projector according to claim 2, wherein said corrector determines said first corrective quantity α1 as:

$$\alpha 1 = (N - V) + \frac{Q - N}{2} \qquad \text{[Equation 1]}$$

where N represents a light emission period of said light source, Q a width period of each of said color stripes, and V said detection period.

7. The projector according to claim 2, wherein said corrector determines said first corrective quantity α1 as:

$$\alpha 1 = (N - V) \qquad \text{[Equation 2]}$$

where N represents a light emission period of said light source and V said detection period.

8. The projector according to claim 2, wherein said corrector determines said second corrective quantity α2 as:

$$\alpha 2 = (N - V) + \frac{Q - N}{2} \qquad \text{[Equation 3]}$$

where N represents a light emission period of said light source, Q a width period of each of said color stripes, and V said detection period.

9. The projector according to claim 2, wherein said corrector determines said second corrective quantity α2 as:

$$\alpha 2 = Q - V \quad [\text{Equation 4}]$$

where Q represents a width period of each of said color stripes and V said detection period.

10. A projector comprising:
a screen having a periodic array of color stripes for producing visible light depending on incident light;
a light source that emits a light beam;
a projection unit that scans an area of said screen where said color stripes are disposed, with said light beam in a direction across said color stripes, to display an image on said screen;
a detector that detects the visible light from each of said color stripes as a feedback light pulse; and
a controller that adjusts a start-of-emission timing of said light source based on a start-of-detection timing at which the feedback light pulse is detected by said detector and a detection period during which the feedback light pulse is detected by said detector, and controlling said light source to emit said light beam in order to apply light pulses to said color stripes within boundaries thereof;
wherein the controller comprises:
a driver that holds control information representing emission intervals of said light source and energizes said light source based on said control information to emit the light pulses therefrom; and
a corrector that corrects the emission intervals represented by said control information based on said start-of-detection timing and said detection period to adjust said start-of-emission timing;
wherein said control information represents a reference time from a start-of-scanning timing represented by a reference signal for a scanning process carried out by said projection unit until a first start-of-emission timing of said light source in said scanning process; and
if the nearest start-of-emission timing of said light source is the last start-of-emission timing of said light source in said scanning process, said corrector corrects the reference time represented by said control information to adjust said start-of-emission timing.

11. A method of controlling a projector including a screen having a periodic array of color stripes for producing visible light depending on incident light, a light source for emitting a light beam, and a projection unit for scanning an area of said screen where said color stripes are disposed, with said light beam in a direction across said color stripes, to display an image on said screen, the method comprising:
detecting the visible light from each of said color stripes as a feedback light pulse; and
adjusting a start-of-emission timing of said light source based on a start-of-detection timing at which the feedback light pulse is detected by said detecting and a detection period during which the feedback light pulse is detected by said detecting, and controlling said light source to emit said light beam in order to apply light pulses to said color stripes within the boundaries thereof,
wherein the adjusting comprises:
holding control information representing emission intervals of said light source and energizing said light source based on said control information to emit the light pulse therefrom; and
correcting the emission intervals represented by said control information based on said start-of-detection timing and said detection period to adjust said start-of-emission timing;
wherein said correcting adjusts said start-of-emission timing for each of said feedback light pulses based on said start-of-detection timing and said detection period of the feedback light pulse; and
wherein if said detection period of said feedback light is smaller than a prescribed period, said correcting adjusts said start-of-emission timing based on said start-of-detection timing of said feedback light.

12. The method according to claim 11, wherein provided that said detection period is smaller than said prescribed period, if the difference between said start-of-detection timing of said feedback light and a nearest start-of-emission timing of said light source is smaller than a prescribed value, said correcting advances a next start-of-emission timing of said light source by a first corrective quantity, and if said difference is equal to or greater than said prescribed value, said correcting retards said next start-of-emission timing by a second corrective quantity.

13. The method according to claim 12, wherein said projection unit sweeps said light beam in one direction and back for each scanning stroke;
provided that said nearest start-of-emission timing of said light source is not a start-of-emission timing immediately before said light beam is swept back, if said difference is equal to or greater than said prescribed value, said correcting advances said next start-of-emission timing by said first corrective quantity, and if said difference is smaller than said prescribed value, said correcting retards said next start-of-emission timing by said second corrective quantity; and
provided that said nearest start-of-emission timing of said light source is a start-of-emission timing immediately before said light beam is swept back, if said difference is equal to or greater than said prescribed value, said correcting retards said next start-of-emission timing by said first corrective quantity, and if said difference is smaller than said prescribed value, said correcting advances said next start-of-emission timing by said second corrective quantity.

14. The method according to claim 11, wherein provided that said detection period is smaller than said prescribed period, if the difference between an end-of-detection timing of said feedback light and a nearest end-of-emission timing of said light source is equal to or greater than a prescribed value, said correcting advances a next start-of-emission timing of said light source by a first corrective quantity, and if said difference is smaller than said prescribed value, said correcting retards said next start-of-emission timing by a second corrective quantity.

15. The method according to claim 14, wherein said projection unit sweeps said light beam in one direction and back for each scanning stroke;
provided that said nearest start-of-emission timing of said light source is not a start-of-emission timing immediately before said light beam is swept back, if said difference is smaller than said prescribed value, said correcting advances said next start-of-emission timing by said first corrective quantity, and if said difference is equal to or greater than said prescribed value, said correcting retards said next start-of-emission timing by said second corrective quantity; and
provided that said nearest start-of-emission timing of said light source is a start-of-emission timing immediately before said light beam is swept back, if said difference is smaller than said prescribed value, said correcting retards said next start-of-emission timing by said first corrective quantity, and if said difference is equal to or greater than said prescribed value, said correcting advances said next start-of-emission timing by said second corrective quantity.

16. The method according to claim 12, wherein said correcting determines said first corrective quantity $\alpha 1$ as:

$$\alpha 1 = (N - V) + \frac{Q - N}{2} \qquad [\text{Equation 1}]$$

where N represents a light emission period of said light source, Q a width period of each of said color stripes, and V said detection period.

17. The method according to claim 12, wherein said correcting determines said first corrective quantity $\alpha 1$ as:

$$\alpha 1 = (N - V) \qquad [\text{Equation 2}]$$

where N represents a light emission period of said light source and V said detection period.

18. The method according to claim 12, wherein said correcting determines said second corrective quantity $\alpha 2$ as:

$$\alpha 2 = (N - V) + \frac{Q - N}{2} \qquad [\text{Equation 3}]$$

where N represents a light emission period of said light source, Q a width period of each of said color stripes, and V said detection period.

19. The method according to claim 12, wherein said correcting determines said second corrective quantity $\alpha 2$ as:

$$\alpha 2 = Q - V \qquad [\text{Equation 4}]$$

where Q represents a width period of each of said color stripes and V said detection period.

20. A method of controlling a projector including a screen having a periodic array of color stripes for producing visible light depending on incident light, a light source for emitting a light beam, and a projection unit for scanning an area of said screen where said color stripes are disposed, with said light beam in a direction across said color stripes, to display an image on said screen, the method comprising:

detecting the visible light from each of said color stripes as a feedback light pulse; and adjusting a start-of-emission timing of said light source based on a start-of-detection timing at which the feedback light pulse is detected by said detecting and a detection period during which the feedback light pulse is detected by said detecting, and controlling said light source to emit said light beam in order to apply light pulses to said color stripes within the boundaries thereof, wherein the adjusting comprises:

holding control information representing emission intervals of said light source and energizing said light source based on said control information to emit the light pulse therefrom; and correcting the emission intervals represented by said control information based on said start-of-detection timing and said detection period to adjust said start-of-emission timing;

wherein said control information represents a reference time from a start-of-scanning timing represented by a reference signal for a scanning process carried out by said projection unit until a first start-of-emission timing of said light source in said scanning process; and if the nearest start-of-emission timing of said light source is the last start-of-emission timing of said light source in said scanning process, said corrector corrects the reference time represented by said control information to adjust said start-of-emission timing.

\* \* \* \* \*